(12) United States Patent
Espinasse

(10) Patent No.: US 9,802,576 B2
(45) Date of Patent: Oct. 31, 2017

(54) END FITTING HAVING A COUPLING DEVICE FOR A WIPER BLADE

(75) Inventor: Philippe Espinasse, Coudes (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 1048 days.

(21) Appl. No.: 14/008,653

(22) PCT Filed: Mar. 26, 2012

(86) PCT No.: PCT/EP2012/055319
§ 371 (c)(1),
(2), (4) Date: Aug. 8, 2014

(87) PCT Pub. No.: WO2012/130797
PCT Pub. Date: Oct. 4, 2012

(65) Prior Publication Data
US 2015/0040337 A1 Feb. 12, 2015

(30) Foreign Application Priority Data

Mar. 31, 2011 (FR) ..................................... 11 52721

(51) Int. Cl.
*B60S 1/38* (2006.01)
*F16B 7/04* (2006.01)
(Continued)

(52) U.S. Cl.
CPC ........... *B60S 1/3891* (2013.01); *B60S 1/3874* (2013.01); *B60S 1/3887* (2013.01); *B60S 1/3896* (2013.01);
(Continued)

(58) Field of Classification Search
CPC .... B60S 1/3886; B60S 1/3891; B60S 1/3893; B60S 1/3887; B60S 1/3894; B60S 1/3896;
(Continued)

(56) References Cited

U.S. PATENT DOCUMENTS

2006/0107485 A1* 5/2006 Kim ........................ B60S 1/38
15/250.201
2007/0240271 A1* 10/2007 Wilms ..................... B60S 1/38
15/145
(Continued)

FOREIGN PATENT DOCUMENTS

DE 10000373 A1 * 8/2001
DE 10 2006 027439 A1 12/2007
(Continued)

OTHER PUBLICATIONS

International Search Report for corresponding International Application No. PCT/EP2012/055319, dated Jun. 12, 2012 (6 pages).

*Primary Examiner* — Gary Graham
(74) *Attorney, Agent, or Firm* — Osha Liang LLP

(57) ABSTRACT

The invention relates to an end piece (11) of a windshield wiper comprising at least one wiper blade (1). Said end piece (11) has a first part (12) and a second part (13) which are connected to each other by a removable attachment means, and a blocking means (28) for preventing the wiper blade (1) from moving relative to the end piece (11), said blocking means (28) comprising a securing device (33) and an actuating element (51). The securing device (33) is designed to pinch the wiper blade (1) and is subject to a force exerted by the actuating element (51). The end piece is for use in motor vehicles.

16 Claims, 4 Drawing Sheets

Figure 7:
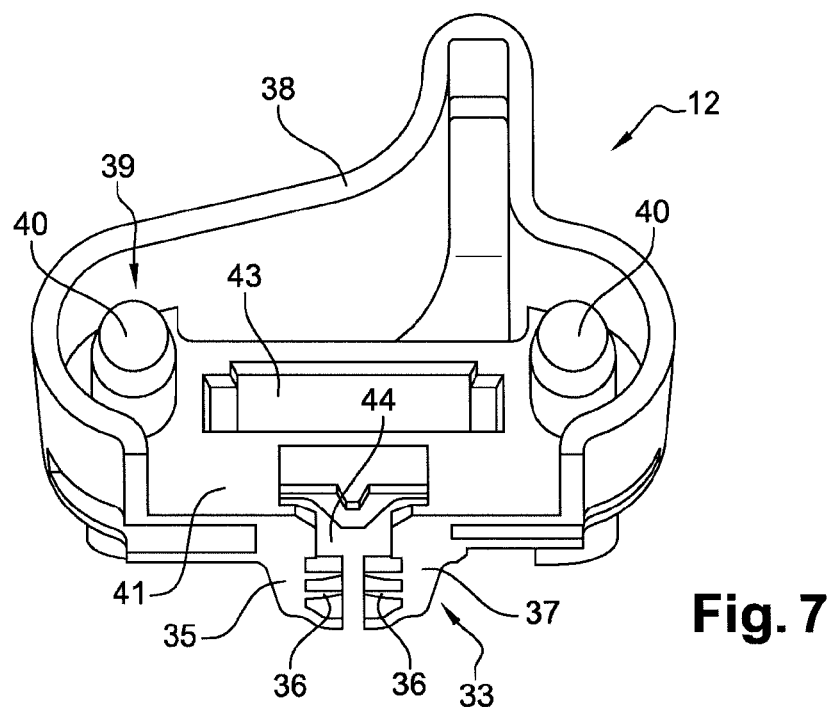

(51) Int. Cl.
*B60S 1/52* (2006.01)
*F16B 2/18* (2006.01)

(52) U.S. Cl.
CPC .............. *B60S 1/524* (2013.01); *F16B 2/18* (2013.01); *F16B 7/0406* (2013.01); *B60S 1/381* (2013.01); *Y10T 403/44* (2015.01)

(58) Field of Classification Search
CPC .... F16B 2/00; F16B 2/005; F16B 2/06; F16B 2/10; F16B 2/12; F16B 2/18; F16B 2/14
USPC .......... 15/250.43, 250.451, 250.44, 250.201, 15/250.453, 250.454
See application file for complete search history.

(56) References Cited

U.S. PATENT DOCUMENTS

| | | |
|---|---|---|
| 2008/0016643 A1 | 1/2008 | Braun et al. |
| 2008/0289134 A1 | 11/2008 | Boussicot et al. |
| 2010/0071148 A1 | 3/2010 | Wilms et al. |

FOREIGN PATENT DOCUMENTS

| | | | |
|---|---|---|---|
| EP | 2 127 969 | A2 | 12/2009 |
| FR | 2 920 729 | A1 | 3/2009 |

\* cited by examiner

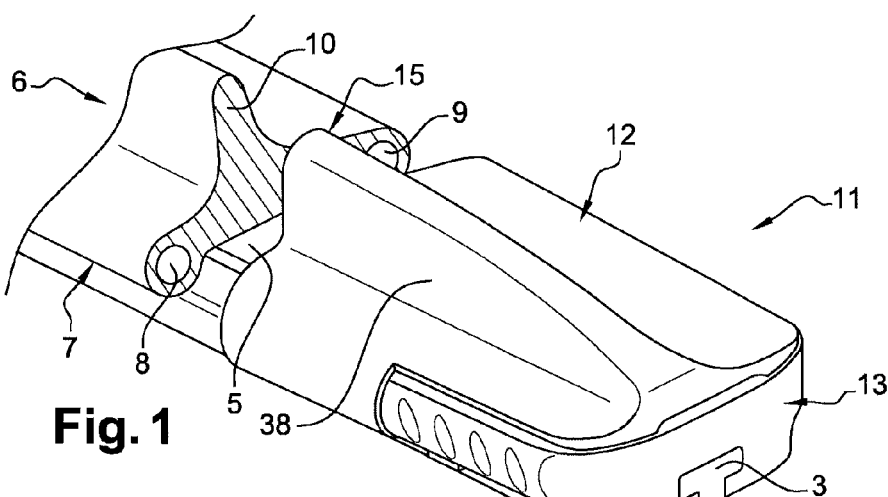
Fig. 1
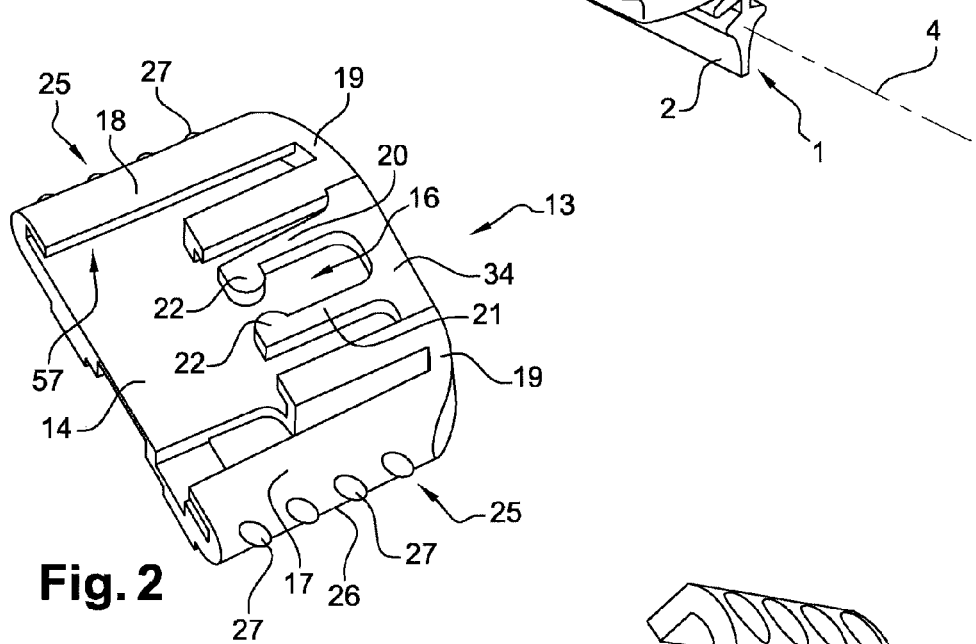
Fig. 2
Fig. 3

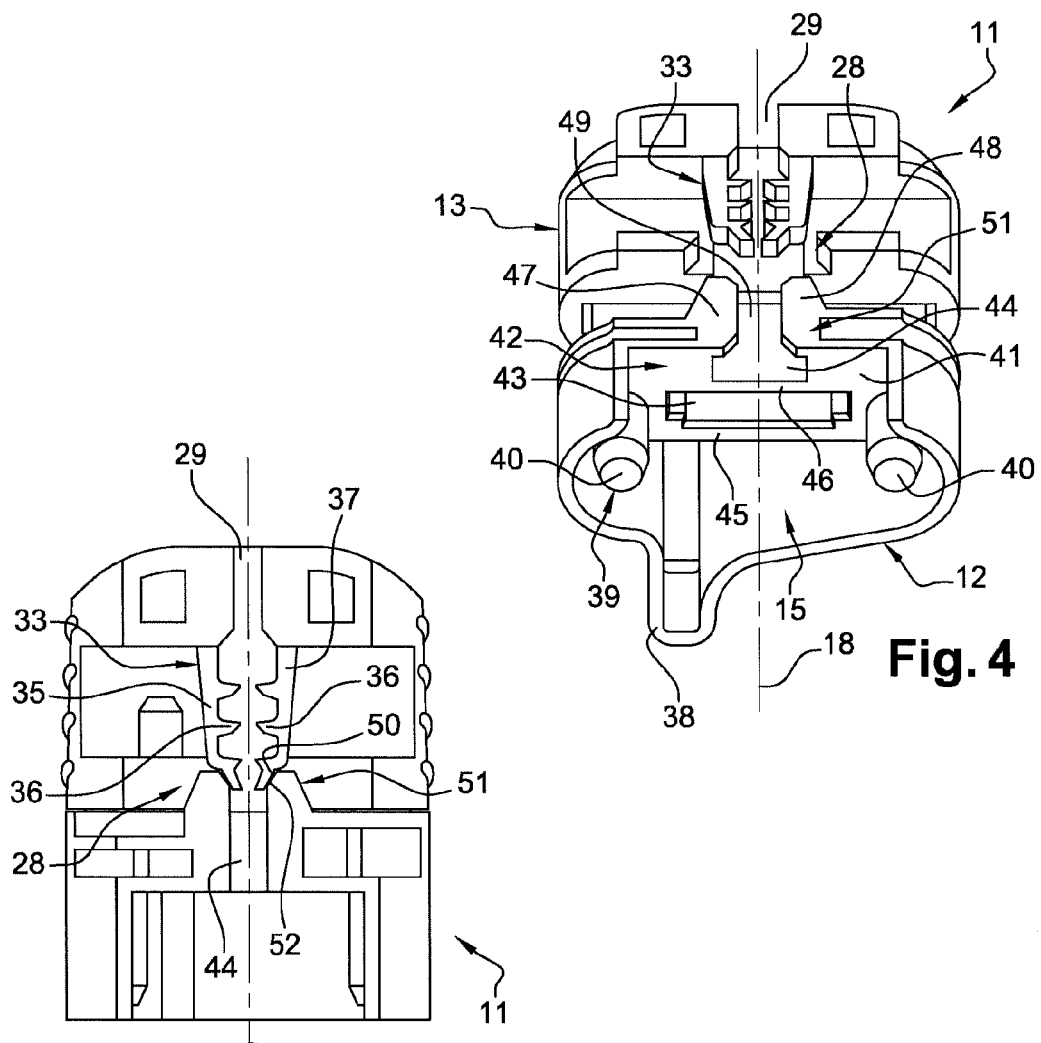
Fig. 4
Fig. 5
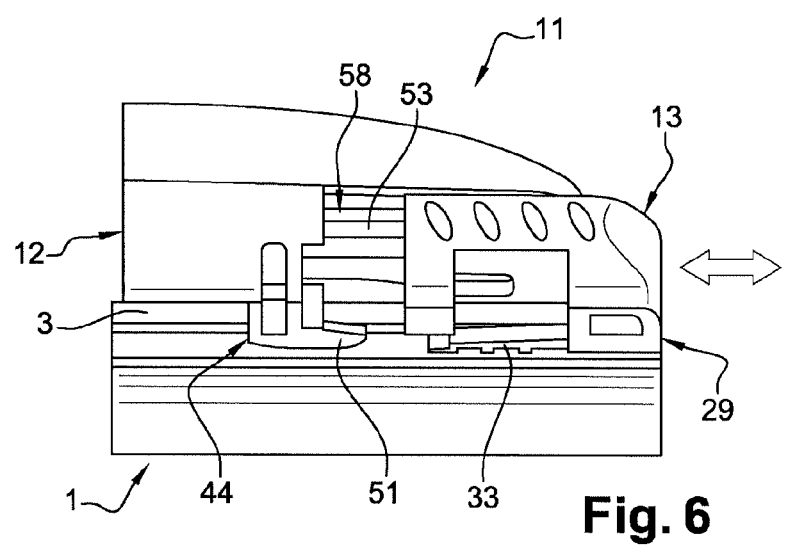
Fig. 6

END FITTING HAVING A COUPLING DEVICE FOR A WIPER BLADE

The field of the present invention is that of equipment for wiping windows, in particular of a motor vehicle.

Motor vehicles are commonly equipped with windshield wiper systems for washing the windshield and avoiding disruption to the driver's view of his surroundings. These windshield wipers are conventionally driven by an arm that carries out an angular to-and-fro movement and have elongate wipers which themselves carry squeegee blades made of a resilient material. These blades rub lo against the windshield and evacuate the water by removing it from the driver's field of view. The wipers are produced in the form either, in a conventional version, of articulated brackets which hold the squeegee blade at a number of discrete locations or, in a more recent version, known as the "flat blade" version, of a semi-rigid assembly which holds the squeegee blade along its entire length. In both solutions, the wiper is attached to the turning arm of the windshield wiper by a connector.

Should the wiping quality deteriorate, it is then necessary to renew the wiping means. There are two solutions: the first consists in replacing the entire wiper with a new wiper while the second solution consists in replacing the squeegee blade while retaining the rest of the wiper.

The invention relates more particularly to this second solution, which involves removing one end of the wiper in order to access the squeegee blade.

In order to fasten the squeegee blade to the constituent support of the wiper, the latter has an end fitting which is mounted at one end of this support and has means for securing it with respect to the support.

Furthermore, windshield wipers are also equipped with devices for feeding a windshield washer liquid which is fed from a tank located on the vehicle and which is sprayed in the direction of the windshield by nozzles located either around the windshield or on the windshield wiper itself for improved distribution of the liquid.

The drawback of this second situation, when only the squeegee blade is replaced, is that the device for feeding liquid is open and thus causes a leak. Furthermore, opening the device for feeding liquid during the phase of replacing the blade produces a risk of impurities entering the device. Such a situation is problematic since these impurities block the nozzles, thereby considerably impairing the efficiency of washing the windshield.

Another drawback of such a situation lies in the difficulty of replacing such a squeegee blade. Specifically, it is appropriate to provide a solution which is as ergonomic as possible for replacing the blade, and it will be appreciated that the presence of a liquid in the handling area complicates the replacement of the blade and the satisfactory refitting thereof. Furthermore, the residual pressure inside the device for feeding liquid can cause liquid to be projected onto the user, it being desirable to avoid this.

The object of the present invention is thus to solve the above-described drawbacks mainly by blocking the device for feeding liquid while enabling easy removal and refitting of the squeegee blade from and on the wiper support, the blade being anchored during the phase in which the primary part and the primary part are secured.

The subject of the invention is thus an end fitting of a wiper having at least one wiper blade, the end fitting comprising a primary part and a secondary part, the primary part and the secondary part being connected by a removable fastening means, the end fitting also comprising an immobilizing means that is able to prevent a movement of the wiper blade with respect to the end fitting, the immobilizing means comprising a coupling device and an actuating element, said coupling device being designed to pinch the wiper blade and being subjected to a force produced by the actuating element.

According to a first feature of the invention, the coupling device has a flared outer face while the actuating element has an inner face having a shape complementary to the outer face of the coupling device.

According to a second feature of the invention, the coupling device is formed by at least one branch on which there is formed at least one tooth that is able to deform the wiper blade.

According to another feature of the invention, the coupling device is formed by two branches which extend in parallel planes, the branches each having at least one tooth, the latter being arranged in an antagonistic manner.

According to a further feature of the invention, the inner face of the actuating element comprises at least one protrusion which emerges from said inner face.

According to yet another feature of the invention, the primary part comprises a primary recess that is able to receive the wiper blade.

Advantageously, the secondary part comprises a secondary recess that is able to receive the blade.

Advantageously again, the coupling device is formed on the primary part while the actuating element is formed on the secondary part.

Alternatively, the coupling device is formed on the secondary part while the actuating element is formed on the primary part.

The end fitting comprises at least one blocking means that is able to plug a constituent liquid channeling device of the wiper, said blocking means being formed on the primary part.

The invention also covers a wiper comprising at least one wiper blade and an end fitting according to any one of the features presented hereinabove. Such a wiper may also comprise at least one liquid channeling device and a vertebra.

A first advantage of the invention lies in the fact that the secondary part can be extracted from the primary part without the presence of liquid that is liable to complicate this extraction. Such extraction thus makes it possible to replace the blade in a dry environment, thereby avoiding any projection of liquid onto the user when the blade is fitted and removed. Since the primary part remains on the wiper, the device for feeding windshield washer liquid is not open, this consequently preventing the introduction of impurities into the lines.

Another advantage lies in the fact that it is particularly simple to replace the blade since a single operation suffices to free or immobilize the squeegee blade with respect to the rest of the wiper. Such an operation does not require that a button be pressed beforehand, or the extraction of an intermediate part, for example.

Figure 8:
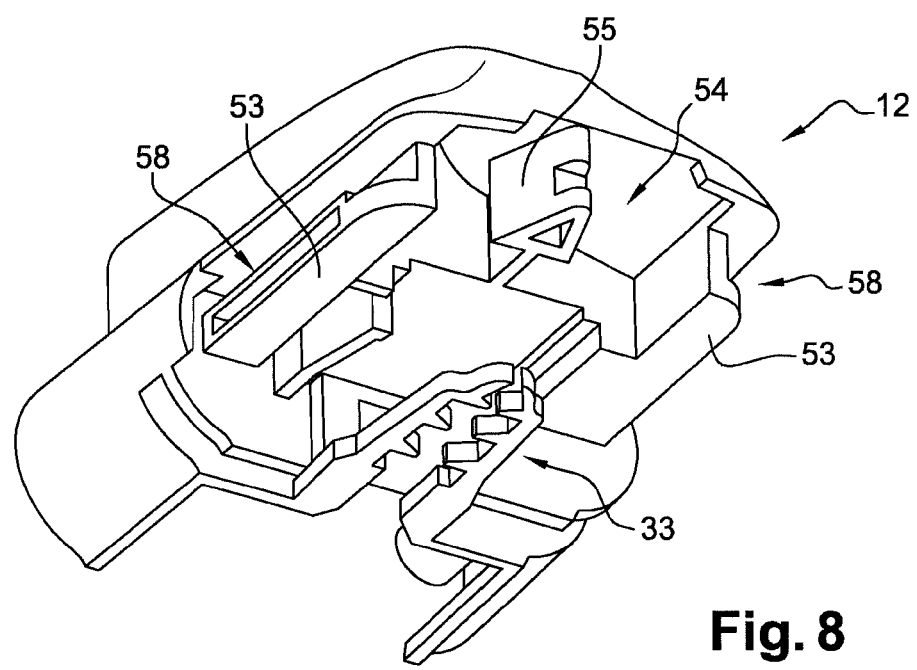
Figure 9:
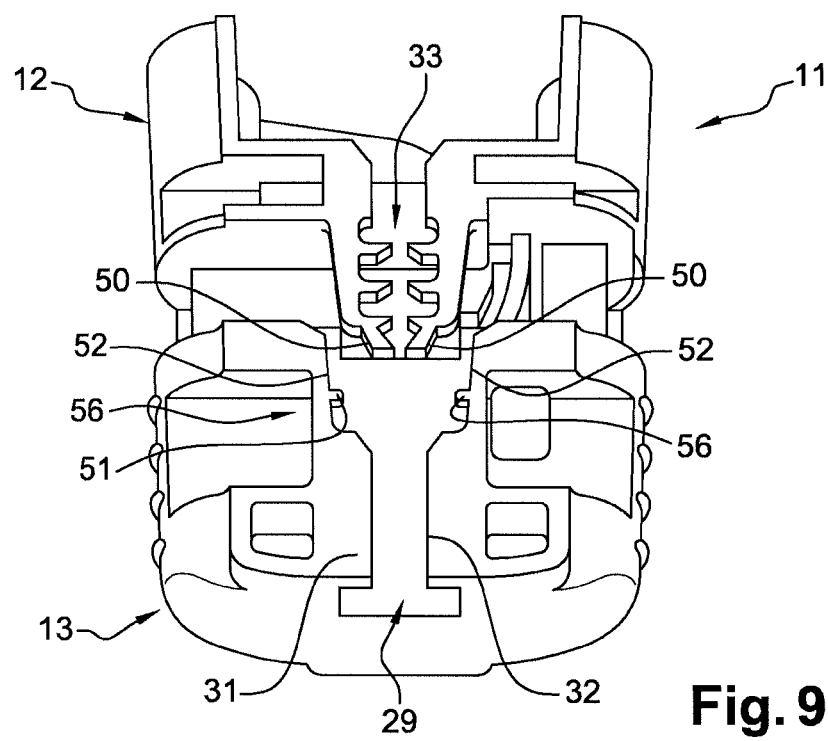
Figure 10:
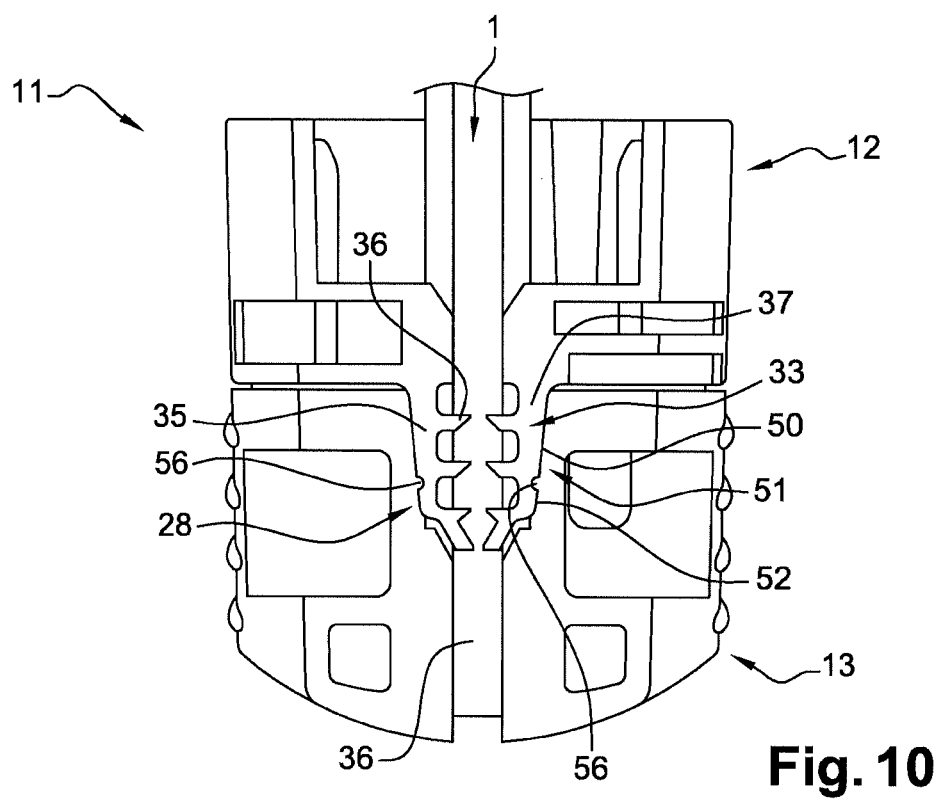

Further features, details and advantages of the invention will become more clearly apparent from reading the description given hereinbelow by way of illustration and with reference to the drawings, in which:

FIG. 1 is a perspective view of a first variant of an end fitting according to the invention installed at the end of a wiper, FIG. 2 is a perspective view of the secondary part used in the first variant of the invention, FIG. 3 is a perspective bottom view of the secondary part used in the first variant of the invention, FIG. 4 is a perspective view of the end fitting according to the first variant during the assembly phase, FIG. 5 is a bottom view of the end fitting according to the first variant, FIG. 6 is a side view of one end of a wiper receiving the end fitting according to the first variant, FIG. 7 is a view of a primary part of an end fitting according to a second variant of the invention, FIG. 8 is a bottom perspective view of the primary part from FIG. 7, FIG. 9 is a perspective view of the end fitting according to the second variant during the assembly phase, FIG. 10 is a cross-sectional bottom view of one end of a wiper receiving the end fitting according to the second variant of the invention.

It should be noted that the figures disclose the invention in a detailed manner so as to implement the invention, and said figures may of course serve to define the invention more clearly, where necessary.

FIG. 1 shows in a partial manner a wiper with which a wiper system mounted on a motor vehicle is provided. This wiper is installed on the front windshield but it may also be mounted on the rear window of the vehicle.

The wiper comprises a wiper blade 1, also known as a squeegee blade, consisting of an area 2 for rubbing against the window and a heel 3 which ensures the mechanical connection to a constituent support of the wiper. This wiper blade 1 extends lengthwise along a first axis 4.

The wiper furthermore comprises a vertebra 5 which forms a stiffening device of the wiper. By way of example, this is a single metal strip which extends lengthwise along the first axis 4 and which has at rest a convex curvature with respect to the windshield. This strip has a predetermined flexibility, which, by deforming when the wiper is pressed against the windshield, brings about a force distributed along the length of the wiper blade 1.

The wiper blade 1 and the vertebra 5 are held by the support 6 which thus forms a longitudinal supporting frame covering the vertebra 5 and the wiper blade 1.

The wiper is provided with a liquid channeling device 7 which is secured to the support 6, for example by clip-fastening, adhesive bonding or more generally by cooperating shapes. The liquid channeling device 7 may also be produced in s one piece with the support 6, as is the case in FIG. 1. The liquid channeling device 7 is in particular in the form of at least two ducts 8 and 9 which extend longitudinally along the wiper along an axis which is for example parallel to the first axis 4, and on either side of the wiper blade 1. More specifically, these ducts 8 and 9 are located on the sides of the support 6 and in the continuation of the plane in which the support 6 extends. This liquid channeling device 7 is manufactured from a flexible material, for example a rubber or an elastomer.

The liquid channeling device 7 may be formed jointly with an air deflector 10, the function of which is to increase the bearing force of the wiper on the windshield, to the benefit of the aerodynamic effect of the air. In this exemplary embodiment, the air deflector 10 and the liquid channeling device 7, in particular the two ducts 8 and 9, are molded from one and the same flexible material, such as a rubber or an elastomer. The air deflector 10 and the liquid channeling device 7 thus form a single part.

An end fitting 11 is installed at at least one end of the wiper. In a general manner, this end fitting 11 carries out a multiplicity of functions:

- it blocks the liquid channeling device 7 of the wiper,
- it allows the wiper blade 1 to be fitted on and removed from the support 6,
- it secures the wiper blade 1 with respect to the support 6. Securing should be understood here as meaning a means for blocking any translation of the wiper blade 1 with respect to the support 6. Thus, once the end fitting 11 is in place, any movement in translation of the wiper blade 1 is prevented, thereby guaranteeing perfect fastening of the latter with respect to the rest of the wiper.

The end fitting 11 comprises a primary part 12 and a secondary part 13 which are mechanically connected together in a removable manner. It will be understood here that the primary part 12 is distinct and separable from the secondary part 13, these two parts being connected together by a fastening means formed both on the primary part 12 and on the secondary part 13.

The primary part 12 has an outer section generally complementary to the outer section of the support 6, of the channeling device 7 and of the deflector 10. Thus, these three components pass into an internal volume 15 delimited by a constituent peripheral wall 38 of the primary part 12.

The primary part 12 has a function of retaining the wiper blade 1, a function of retaining the vertebra 5 and a function of blocking the liquid channeling device 7, while the secondary part 13 ensures a function of retaining the wiper blade and a function of positioning this wiper blade 1 along the first axis 4.

The primary part 12 forms a cover which, when the wiper is placed in a horizontal plane, covers the secondary part 12. In other words, this primary part 12 is placed above and in the continuation of the secondary part and has a peripheral wall 38 having a shape corresponding to, in other words complementary with, the shape of the support 6, including the liquid channeling means 7 and/or the deflector 10. The primary part 12 thus comprises a deformation in which the secondary part 13 is housed.

FIG. 2 shows the secondary part 13 in a top view, that is to say a view of the side which directly faces the primary part. This secondary part 13 is formed by a central wall 14 on which there originates a first part 57 of the removable fastening means and coupling device 33 which is part of an immobilizing means 28 for the wiper blade. This coupling device 33 anchors the blade, thereby limiting its movement in translation.

The first part 57 of the removable fastening means is formed by a first groove 17 and a second groove 18 that are formed on two flanks of the central wall 14. These grooves have a U-shaped section so as to produce a sliding or guiding function with respect to the primary part. These two grooves 17 and 18 comprise a stop 19 produced by an end wall 34 of the secondary part 13.

The secondary part 13 also comprises a device 16 for locking the connection produced between the primary part and the secondary part 13. This locking device 16 has the function of avoiding any undesired translation between the primary part and the secondary part 13. This locking means thus comprises two flexible arms 20 and 21 at the end of which a retention means 22 in the form of a semicircle is made. The two arms 20 and 21 originate on the end wall 34 and enclose a head (visible in FIG. 8) in the form of an arrow head that is formed on the primary part. This head comprises in particular two oblique faces which tend to move the flexible arms 20 and 21 apart during the introduction of the secondary part 13 into the primary part.

When the secondary part 13 is in its final position in the primary part, the retention means 22 are in abutment against edges that are adjacent to the oblique faces of the head. Since the arms 20 and 21 are flexible, the fastening means between the primary part and the secondary part is rendered removable.

The secondary part 13 also comprises a gripping device 25 produced on the outer face of the secondary part. More specifically, this gripping device 25 is produced by way of a plurality of bosses 27 which extend in a manner parallel to lo one another and in an inclined direction with respect to the plane of the central wall 14.

FIG. 3 shows the secondary part 13 in a perspective bottom view. Such a perspective shows a constituent coupling device 33 of an immobilizing means 28 intended to prevent any movement of the wiper blade.

The secondary part 3 comprises a secondary recess 29 that is able to receive the wiper blade, this secondary recess 29 extending along a longitudinal axis 18 parallel to the first axis 4 along which the wiper blade 1 extends.

The secondary recess 29 receives the heel of the wiper blade. This secondary recess 29 is formed by a removal of material in the region of the end wall 34 of the secondary part 13 and has a section complementary to the section of the heel, for example a rectangular section. Such a secondary recess 29 extends longitudinally opposite the locking means 16 with respect to the central wall 14. The end wall also comprises a cutout 30 which is aligned with the secondary recess 29 and which opens the latter toward the surroundings of the secondary part 13. Such a cutout 30, which has a smaller width than the width of the secondary recess 29 measured along a transverse axis perpendicular to the longitudinal axis 18, enables the passage of the heel. This cutout 30 is bordered by a first edge surface 31 and a second edge surface 32, the latter serving as a slide for extracting or inserting the wiper blade.

The immobilizing means 28 consists mainly of two sub-assemblies: a coupling device 33 and an actuating element 51. According to this first variant of the end fitting according to the invention, the coupling device 33 protrudes from the secondary part while the actuating element is formed on the primary part. It will will thus be understood that the coupling device 33 is molded simultaneously with the secondary part 13 while the actuating element 51 is molded simultaneously with the primary part 12. These moldings are produced from a plastics material.

The coupling device 33 originates on the end wall 34 and extends in a direction generally parallel to the longitudinal axis 18. The coupling device 33 is formed by at least one branch 35 on which at least one tooth 36 is formed. Advantageously, the coupling device comprises two branches with the references 35 and 37, each being provided with a plurality of teeth 36. These two branches 35 and 37 extend in one and the same plane, advantageously parallel to a plane in which the central wall 14 extends. In such a situation, the two branches 35 and 37 are arranged such that their respective teeth face one another. In other words, at least one tooth of one branch is installed facing a tooth of the other branch, in an antagonistic manner.

Alternatively, the invention provides for at least one tooth of one branch to be offset with respect to the immediately adjacent tooth of the other branch. Such an arrangement allows each tooth to pass more deeply into the constituent material of the wiper blade, without coming into contact with the opposing tooth.

This FIG. 3 also shows an outer face 50 of the coupling device 33, the qualifier "outer" meaning that the wall in question is at an outwardly facing periphery of the component delimited by the face.

FIG. 4 shows the end fitting 11 consisting of its primary part 12 and its secondary part 13 during the guiding phase and prior to locking by way of the locking means detailed hereinabove.

The internal volume 15 is particularly visible here. An exemplary embodiment of a blocking means 39 is shown in this figure, said means being disposed inside this internal volume. This blocking means 39 has the function of plugging, or closing, the fluid channeling device of the wiper. To do this, the secondary part 13 comprises at least one stud 40 arranged so as to face the duct. This stud 40 is a tubular protuberance which extends along an axis parallel to the longitudinal axis 18 and coincident with an axis along which the duct in question extends. The outside diameter of this stud 40 is slightly greater than the inside diameter of the respective duct. Since the constituent material of the ducts is flexible, this material deforms in order to fit over the stud 40 and thus to be liquid-tight. It will finally be noted that the free end of the stud 40 has a bevel which makes it easier to introduce the stud into the duct.

The blocking means 39 may have other embodiments as long as it seals the liquid channeling device at the ends of the wiper. By way of example, the blocking device may be formed by planar abutment of the end of the ducts 8 or 9 directly against a flank 41 which borders a constituent body 42 of the primary part 12.

The primary part 12 comprises a housing 43 that is able to receive the vertebra and a primary recess 44 that is able to receive the wiper blade, this primary recess 44 extending along the longitudinal axis 18. In other words, the primary recess 44 produced in the primary part 12 is located in the continuation of the secondary recess 29 produced in the secondary part 13.

The housing 43 is formed in the constituent body 42 of the primary part 12. This housing 43 corresponds to a rectangular removal of material which extends along the longitudinal axis 18. The shape of this housing 43 is complementary to a cross section of the vertebra. This housing 43 is thus delimited on one side by an upper constituent wall 45 of the body 42, and on the other side by an intermediate wall 46, the latter being interposed between the housing 43 and the primary recess 44.

The two studs 40 extend in a plane parallel to the plane of the upper wall 45. The peripheral wall 38 delimits the internal volume 15 and surrounds the studs 40 through at least 180°.

The primary recess 44 is bordered by a first edge 47 and by a second edge 48 that are spaced apart so as to delimit a slot 49 in which the wiper blade slides.

FIG. 5 shows the engagement between the actuating element 51 and the coupling device 33. In practice, the actuating element 51 is produced by a continuation of the first edge 47 and/or of the second edge 48.

The outer face 50 of the coupling device 33 is formed by an edge produced at the end of each of the branches 35 and 37. There are thus two outer faces 50, the planes of which each extend in a direction converging at a point located on the longitudinal axis 18.

The actuating element 51 also comprises an inner face 52 having a shape that is complementary with, in other words corresponding to, the flared shape of the outer face 50 of the coupling device 33. To this end, the continuations that form the actuating element 51 have a bevel that forms two flats which extend in two directions converging at a point on the longitudinal axis 18.

The branches 35 and 37 of the coupling device are flexible. Specifically, the fact that these branches emerge from the end wall 34 gives them the ability to move toward one another. When the actuating element 51 comes into abutment against the outer face 50 of the coupling device 33, the inner face 52 exerts a force which moves the two branches 35 and 37 toward one another. Such an arrangement allows the teeth 36 of each branch to pinch the wiper blade, the teeth 36 being produced from a plastics material that is more rigid than the wiper blade, lo thereby making it possible for them to be anchored in the constituent material of the wiper blade 1. Thus, any movement of the blade in translation with respect to the end fitting 11 is prevented. Such pinching takes place simultaneously with the securing between the primary part 12 and the secondary part 13 with the aid of the removable fastening means.

FIG. 6 illustrates the manipulation of the secondary part 13 with respect to the primary part 12. The latter comprises a second constituent part 58 of the fastening means, said second part 58 being formed on the primary part 12.

This second part 58 of the removable fastening means comprises two channels 53 that are formed on each side of the primary part 12. These channels 53 extend in a plane parallel to an upper face of the heel 3 of the wiper blade 1 and allow the secondary part 13 to slide in the primary part 12. In a more detailed manner, the channels 53 slide in the grooves made in the secondary part.

When the secondary part 13 is extracted from the primary part 12, the wiper blade 1 can slide freely in the primary recess 44 and in the secondary recess 29. Once the wiper blade 1 is in place, the secondary part 13 is brought into its final position, the actuating element 51 exerting a force on the coupling device 33, producing antagonistic pressure on the two branches 35 and 37.

The coupling device 33 is thus subjected to a mechanical force by the actuating element 51, the conical nature of the inner faces 52 bearing against the branches 35 and 37 in the region of their outer faces 50. This results in a deformation of these branches 35 and 37 and pinching of the wiper blade 1 by the teeth 36.

FIGS. 7 to 10 show a second variant embodiment of the end fitting according to the invention.

Unlike the first variant, the coupling device 33 protrudes from the primary part 12. Similarly, the actuating element is formed on the secondary part. It will thus be understood that the coupling device 33 is molded simultaneously with the primary part 12 while the actuating element 51 is molded simultaneously with the secondary part 12. These moldings are produced from a plastics material.

FIG. 7 shows the primary part 12. The following description will only explain the differences from the primary part of the first variant. Reference should be made to the above description in order to be acquainted with the structure of the identical elements such as, for example, the peripheral wall 38, the blocking means 39, the housing 43 and the primary recess 44.

The coupling device 33 originates on the flank 41. The constitution of this coupling device 33 is identical to the one described with respect to the first variant. The branches 35 and 37 are provided with teeth 36, between which a cutout 30 is formed where the wiper blade is intended to be installed. These branches extend in an opposite direction to the direction of extension of the studs 40 forming the blocking means 39. In other words, the flank 41 is interposed between this blocking means 39 and the coupling device 33.

FIG. 8 is a bottom view of the primary part 12 used in the second variant of the end fitting. This figure shows the structure of the primary part 12 in line with the deformation which receives the secondary part. The two channels 53 forming the second part 58 of the removable fastening means are visible here and it can be seen that their section is L-shaped. Located in a cavity 54 formed at the end of the primary part 12 is the head 55 which is intended to engage with the locking means, which is for example identical to the one detailed in FIG. 2.

FIG. 9 shows the end fitting 11 during the guiding phase of the secondary part 13 in the deformation of the primary part 12.

The structure of the secondary part is similar to that described with respect to the first variant of the end fitting and reference should be made to the description thereof in order to be acquainted with the structure of the identical elements. The following description is thus limited to the description of the differences.

The actuating element 51 is produced on the secondary part 13. More specifically, this actuating element 51 is produced by a continuation of the first edge surface 31 and of the second edge surface 32, these edge surfaces delimiting the secondary recess 29.

These continuations are each provided with the inner face 52 which has a shape complementary to the outer face 50 formed on the primary part 12. Thus, these two inner faces 50 and these two outer faces 52 are arranged so as to form a conical extension by coupling. In other words, the two outer faces 50 produced on the branches 35 and 37 and the two inner faces 52 of the continuations are inscribed in concentric cones.

Advantageously, each inner face 52 comprises at least one protrusion 56 which emerges from the inner face 52 in the region of the secondary recess 29. These two protrusions 56 are thus for example installed opposite one another. Each of these protrusions is formed by a protuberance of the constituent plastics material of the secondary part 13.

FIG. 10 shows the end fitting according to the second variant, where the secondary part 13 is in the position immobilizing the wiper blade 1 with respect to the primary part 12.

The coupling device 33 is then subjected to a mechanical force by the actuating element 51, the conical nature of the inner faces 52 bearing against the branches 35 and 37 in the region of their outer faces 50. This results in a deformation of these branches 35 and 37 and pinching of the wiper blade 1 by the teeth 36. The protrusions 56 increase the force exerted by the coupling device 33 on the wiper blade 1.

A wiper blade 1 of a wiper comprising at least one end fitting 11 illustrated in the previously detailed figures is replaced in the following way:

Extraction of the secondary part 13 from the primary part 12 by the secondary part 13 being pulled in a direction parallel to a first axis 4 in which the wiper blade 1 extends longitudinally, Removal, by a movement in translation, of the wiper blade 1 to be replaced, the primary part 12 remaining secured to the wiper, Insertion of a new wiper blade 1 by a movement in translation, threading it into the primary recess 44 in the primary part 12, Alignment of the wiper blade 1 with one end of the primary part 12, Mounting of the secondary part 13 on the primary part 12 with the aid of a removable fastening means, Immobilization of the wiper blade simultaneously with locking of the secondary part 13 on the primary part 12.

The invention claimed is:

1. An end fitting of a wiper having at least one wiper blade, the end fitting comprising:
    a primary part and a secondary part, the primary part and the secondary part being connected by a removable fastening means; and
    an immobilizing means that is able to prevent a movement of the wiper blade with respect to the end fitting, the immobilizing means comprising a coupling device and an actuating element, wherein said coupling device is configured to pinch a vertical portion of the wiper blade from opposed lateral sides of the wiper blade and wherein the coupling device is subjected to a force produced by the actuating element.

2. The end fitting as claimed in claim 1, wherein the coupling device has a flared outer face while the actuating element has an inner face having a shape complementary to the outer face of the coupling device.

3. The end fitting as claimed in claim 2, wherein the inner face of the actuating element comprises at least one protrusion which emerges from said inner face.

4. The end fitting as claimed in claim 1, wherein the coupling device is formed by at least one branch on which there is formed at least one tooth that is able to deform the wiper blade.

5. The end fitting as claimed in claim 1, wherein the primary part comprises a primary recess that is able to receive the wiper blade.

6. The end fitting as claimed in claim 1, wherein the secondary part comprises a secondary recess that is able to receive the wiper blade.

7. The end fitting as claimed in claim 1, wherein the coupling device is formed on the primary part while the actuating element is formed on the secondary part.

8. The end fitting as claimed in claim 1, wherein the coupling device is formed on the secondary part while the actuating element is formed on the primary part.

9. The end fitting as claimed in claim 1, wherein at least one blocking means that is able to plug a constituent liquid channeling device of the wiper is provided, said blocking means being formed on the primary part.

10. The end fitting as claimed in claim 1, wherein the actuating element is produced by a continuation of a first edge and of a second edge that border a primary recess of the primary part.

11. The end fitting as claimed in claim 1, wherein the actuating element is produced by a continuation of a first edge surface and of a second edge surface delimiting a secondary recess of the secondary part.

12. An end fitting of a wiper having at least one wiper blade, the end fitting comprising:
    a primary part and a secondary part, the primary part and the secondary part being connected by a removable fastening means; and
    an immobilizing means that is able to prevent a movement of the wiper blade with respect to the end fitting, the immobilizing means comprising a coupling device and an actuating element, said coupling device being designed to pinch a vertical portion the wiper blade and being subjected to a force produced by the actuating element,
    wherein the coupling device is formed by two branches which extend in parallel planes, the branches each having at least one tooth, and
    wherein the at least one tooth of one branch faces the at least one tooth of the other branch.

13. A wiper comprising at least one wiper blade and an end fitting, said end fitting comprising:
    a primary part and a secondary part, the primary part and the secondary part being connected by a removable fastening means; and
    an immobilizing means that is able to prevent a movement of the wiper blade with respect to the end fitting, the immobilizing means comprising a coupling device and an actuating element,
    wherein the coupling device is configured to pinch a vertical portion of the wiper blade from opposed sides of the wiper blade and
    wherein the coupling device is subjected to a force produced by the actuating element.

14. The wiper as claimed in claim 13, further comprising at least one liquid channeling device and a vertebra.

15. The wiper as claimed in claim 13, wherein the coupling device is formed by at least one branch on which there is formed at least one tooth being produced from a plastics material that is more rigid than the wiper blade, thereby making it possible for said tooth to be anchored in the constituent material of the wiper blade.

16. An end fitting of a wiper having at least one wiper blade, the end fitting comprising:
    a primary part and a secondary part, the primary part and the secondary part being connected by a removable fastening means; and
    an immobilizing means that is able to prevent a movement of the wiper blade with respect to the end fitting, the immobilizing means comprising a coupling device and an actuating element, said coupling device being designed to pinch the wiper blade and being subjected to a force produced by the actuating element,
    wherein the coupling device is formed by two branches which extend in parallel planes, the branches each having at least one tooth, the at least one tooth of one branch being offset with respect to the immediately adjacent tooth of the other of the two branches.

* * * * *